J. C. MacLACHLAN.
APPARATUS FOR PRODUCING POWDERED MEAT PRODUCTS AND THE LIKE.
APPLICATION FILED APR. 3, 1919.

1,335,121.  Patented Mar. 30, 1920.
2 SHEETS—SHEET 1.

Witnesses
A. H. Opsahl
Geo. Knutson

Inventor
JOHN C. MAC LACHLAN
By his Attorneys
Williamson & Merchant

J. C. MacLACHLAN.
APPARATUS FOR PRODUCING POWDERED MEAT PRODUCTS AND THE LIKE.
APPLICATION FILED APR. 3, 1919.

1,335,121.

Patented Mar. 30, 1920.
2 SHEETS—SHEET 2.

Witnesses

Inventor
JOHN C. MacLACHLAN
By his Attorneys

UNITED STATES PATENT OFFICE.

JOHN C. MacLACHLAN, OF ST. PAUL, MINNESOTA.

APPARATUS FOR PRODUCING POWDERED MEAT PRODUCTS AND THE LIKE.

1,335,121.      Specification of Letters Patent.      Patented Mar. 30, 1920.

Application filed April 3, 1919. Serial No. 287,233.

*To all whom it may concern:*

Be it known that I, JOHN C. MACLACHLAN, a citizen of the United States, residing at St. Paul, in the county of Ramsey and State of Minnesota, have invented certain new and useful Improvements in Apparatus for Producing Powdered Meat Products and the like; and I do hereby declare the following to be a full, clear, and exact description of the invention, such as will enable others skilled in the art to which it appertains to make and use the same.

My present invention has for its object to provide an improved apparatus especially adapted for reducing meat, or the like, to a powdered or finely divided dry form in which the powdered meat will contain all of the food constituents, to wit, all of the organic and inorganic material of the original meat with all but a small per cent. of water extracted therefrom.

The present apparatus is in the nature of a modification of the apparatus broadly claimed in my prior Patent No. 1,301,288, of date April 22, 1919, entitled "Apparatus for granulating semi-fluid materials".

The chief novelty in the present invention is found in the improved form of rotary extensible head from which the meat is ejected and by which it is beaten into powdered form in the presence of a hot drying medium.

The invention is illustrated in the accompanying drawings wherein like characters indicate like parts throughout the several views. Referring to the drawings:—

The numeral 4 indicates a fragment of the upper portion of a housing through which hot air is circulated, preferably substantially as more fully illustrated in my said prior application.

Figure 1:
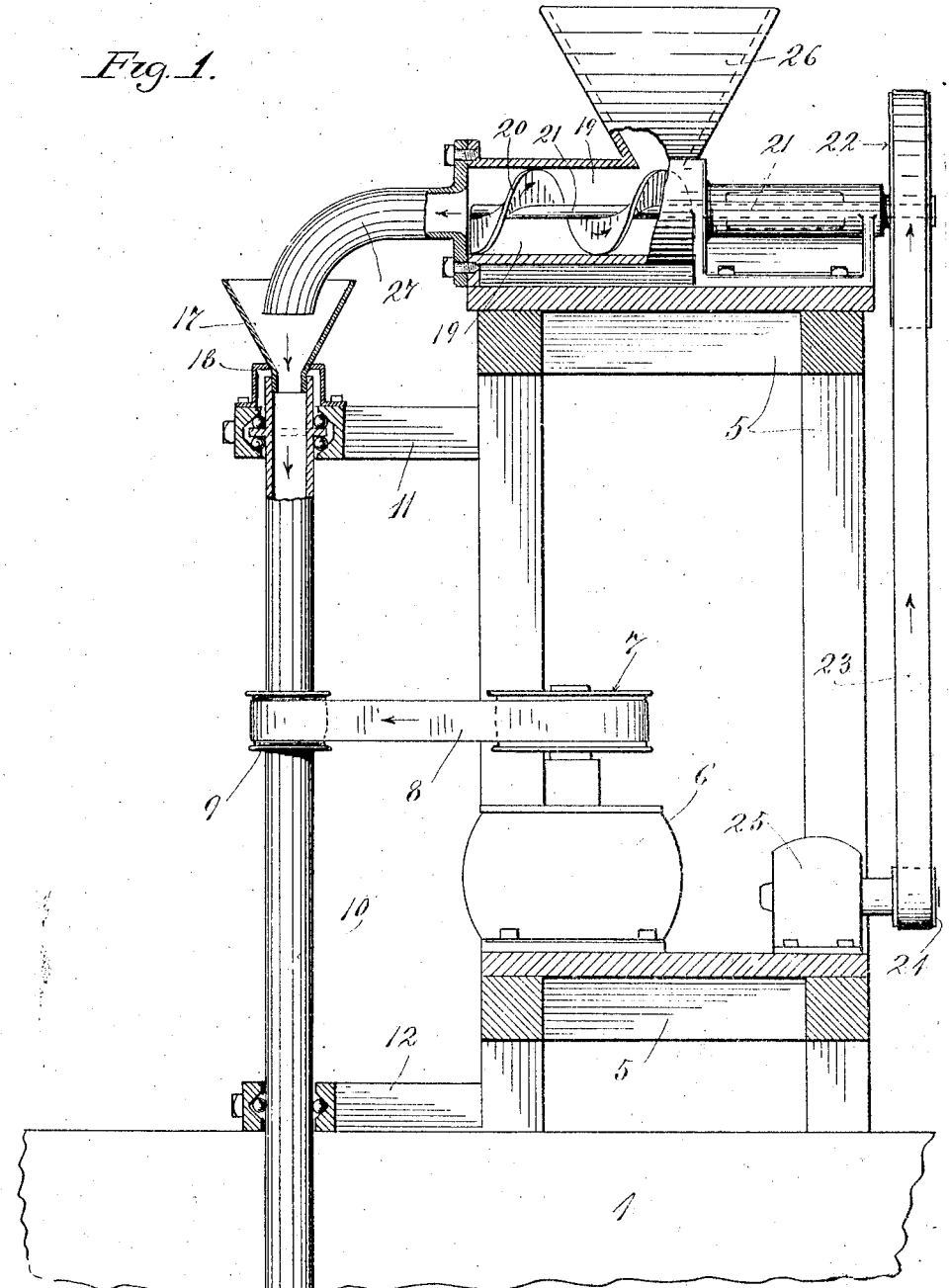
Figure 1 is a vertical section illustrating the invention.
Figure 3:
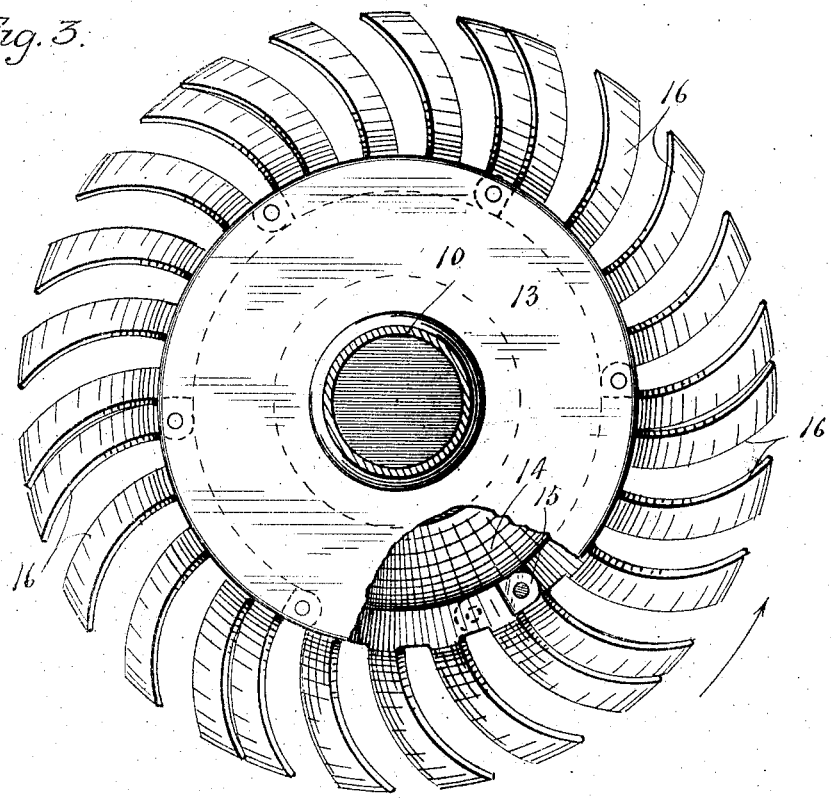
Fig. 3 is a section on the line 3—3 of Fig. 2.
Figure 2:
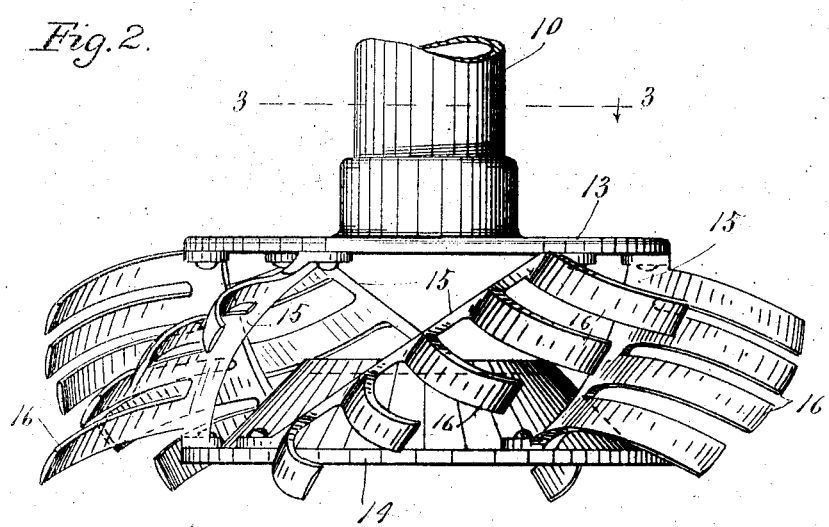
Fig. 2 is a side elevation of the improved discharge head.

The numeral 5 indicates a framework mounted above the housing 4 and on which is mounted a motor, such as an electric motor 6, the armature shaft of which is vertically extended and equipped with a driving pulley 7. A belt 8 runs over the pulley 7 and over a smaller pulley 9 on the tubular shaft 10 that is journaled in suitable bearings on projections 11 and 12 from one side of the framework 5. To the lower end of the tubular shaft 10 and within the housing 4 is secured the improved discharge head. This discharge head, as preferably constructed, comprises an annular upper plate 13, an upwardly bulged concavo-convex lower plate 14 and a plurality of circumferentially spaced oblique bars 15 provided with curved beating prongs or fingers 16. The hub of the plate 13 is rigidly secured to the lower end of tubular shaft 10 and the ends of the bars 15 are rigidly secured to said plate 13 and to the rim of the bottom plate 14. The beating prongs 16 are vertically spaced on the bars 15 and are forwardly curved in respect to the direction of rotation of the discharge head, such direction being indicated on Fig. 3 by a large arrow. The plates 13 and 14 are thus rigidly connected but held with considerable space between them and with the approximately flat top portion of the bottom plate 14 immediately under the open lower end of the tubular shaft 10.

In the arrangement shown, a funnel 17 is telescoped into the upper end of the tubular shaft 10 and held in position by a socket 18 on the upper arm 11. Secured on top of the frame 5 is a horizontally disposed cylinder 19 in which works a feed screw 20, the shaft 21 of which extends through a bearing at the rear end of said cylinder and is provided with a large pulley 22.

A belt 23 runs over the pulley 22 and over a smaller pulley 24 of a small slow running electric motor 25 mounted on the frame 5. The cylindrical casing 19 has a hopper 26 that opens into one end thereof, and at its discharge end, said casing has a downwardly curved discharge-tube 27 that opens into the funnel 17. In operation, the tubular shaft 10 and the discharge head will be driven at very high speed, usually about 5000 revolutions per minute, while the feed screw 20 will be slowly rotated. The meat that is to be desiccated and powdered will first be finely chopped or cut up, as by running the same through an ordinary sausage machine, and when placed in the hopper 26 will be fed to the casing 19, and by the feed screw, will be discharged into the funnel through the tube 27, and from thence, will fall through the funnel and the tubular shaft 10 to the discharge head. The meat that drops onto the raised bottom of the lower plate 14 of the discharge head will be thrown violently outward under the action of centrifugal force and in its outward movement it will be engaged by the prongs 16. These prongs running at such terrifically high speed will engage the meat particles over and over again before the meat can be freed from the action thereof, and this takes place in the drying medium, the meat substance will be reduced to a finely divided or powdered form and will be in dry condition by the time it reaches the bottom of the housing. It should be noted that the beating prongs are not only curved but that they are set on a bevel. The curved form prevents too rapid outward throwing of the meat particles and insures a repetition of the beating action, while the inclination of the prongs produces a downward general deflection, so that the meat particles will be engaged repeatedly by the prongs of the same bar as well as by the prongs of adjacent bars. The exact manner in which these beating prongs act on the meat particles cannot be stated with absolute certainty, but the above statement is thought to be substantially correct. At any rate, there is no question as to the results obtained, as has been demonstrated repeatedly in practice. The meat particles need not be cut finer than for ordinary sausage, but should be in moist condition when subjected to the action of the beating head. The beating head absolutely tears up all of the fiber of the meat particles and the powder produced, by me in practice, has been so fine that it is almost impalpable. Nevertheless, this desiccated powdered meat product contains all of the food elements of the original meat, to wit, all of the organic and inorganic substances with the greater part of the water taken out. Analysis shows the meat product which I have produced to be:—moisture 4.87 per cent.; ash, 8.03 per cent.; unconsumed inorganic solids, 5.68 per cent., which would include all inorganic salts as sodium, potassium and calcium and phosphates and chlorids; proteids, 65.44 per cent.

The above product was produced from lean beef, and hence, contained no fats of any material quantity. This meat product is not herein claimed, but is made the subject matter of a companion application filed of even date herewith, entitled "Powdered meat product".

This improved device, while capable of use, very generally, for reducing semifluid, pasty or similar substances to powdered finely divided form, it is, nevertheless, especially designed for thus reducing meats, vegetables, fruits and other fibrous materials to such powdered or finely divided desiccated condition in the presence of a drying medium, such as hot air.

What I claim is:

1. A device of the kind described comprising a tubular feed shaft provided at its lower end with a discharge head for throwing the material centrifugally outward, and a rotary beater head spaced outward from and surrounding said discharge head in position to intercept and beat the material thrown outward from said discharge head, said beater head having a multiplicity of outstanding circumferentially and vertically spaced beating prongs.

2. A device of the kind described comprising a tubular shaft provided at its lower end with a beater head, said beater head surrounding the open central portion thereof, having a multiplicity of circumferentially and vertically spaced forwardly curved obliquely set beater prongs arranged in obique series with the one series circumferentially ahead of the other.

3. A device of the kind described comprising a tubular shaft provided at its lower end with a beater head, said beater head surrounding the open central portion thereof, having a multiplicity of circumferentially and vertically spaced beating prongs arranged in oblique series and means for rotating said tubular shaft and its beater head at very high speed.

4. In a device of the kind described, the combination with an upright tubular shaft and means for rotating the same at high speed, of a beater head comprising upper and lower plates, the former of which is secured to the lower end of said tubular shaft, and oblique circumferentially spaced bars radially connecting the marginal portions of said upper and lower plates, said bars, each having a plurality of outstanding forwardly curved vertically spaced beating prongs.

5. In a device of the kind described, the combination with an upright tubular shaft and means for rotating the same at high speed, of a beater head comprising upper and lower plates, the former of which is secured to the lower end of said tubular shaft, and oblique circumferentially spaced bars radially connecting the marginal portions of said upper and lower plates, said bars, each having a plurality of outstanding forwardly curved vertically spaced beating prongs, the central portion of said lower plate being raised to a plane above the lower beating prongs.

In testimony whereof I affix my signature in presence of two witnesses.

JOHN C. MacLACHLAN.

Witnesses:
CLARA DEMAREST,
F. D. MERCHANT.